United States Patent
Futagami

(10) Patent No.: US 9,707,952 B2
(45) Date of Patent: Jul. 18, 2017

(54) STOPPING CONTROL APPARATUS FOR VEHICLE

(71) Applicant: TOYOTA JIDOSHA KABUSHIKI KAISHA, Toyota-shi, Aichi-ken (JP)

(72) Inventor: Kosuke Futagami, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/274,070

(22) Filed: Sep. 23, 2016

(65) Prior Publication Data
US 2017/0088112 A1 Mar. 30, 2017

(30) Foreign Application Priority Data

Sep. 30, 2015 (JP) ................................. 2015-194267

(51) Int. Cl.
| | | |
|---|---|---|
| *B60W 10/11* | (2012.01) | |
| *B60W 10/184* | (2012.01) | |
| *B60W 10/18* | (2012.01) | |
| *B60T 13/66* | (2006.01) | |
| *B60W 10/10* | (2012.01) | |

(52) U.S. Cl.
CPC ........... *B60W 10/18* (2013.01); *B60T 13/662* (2013.01); *B60W 10/10* (2013.01); *B60T 2201/06* (2013.01); *B60T 2260/04* (2013.01); *B60W 2510/182* (2013.01); *B60W 2710/1005* (2013.01); *B60W 2710/182* (2013.01)

(58) Field of Classification Search
None
See application file for complete search history.

(56) References Cited

U.S. PATENT DOCUMENTS

| | | | |
|---|---|---|---|
| 2007/0225117 A1* | 9/2007 | Shimizu | B60T 7/12 477/182 |
| 2013/0252784 A1* | 9/2013 | Kinoshita | B60W 10/182 477/92 |
| 2014/0350806 A1* | 11/2014 | Koike | B60W 10/184 701/53 |

FOREIGN PATENT DOCUMENTS

| | | |
|---|---|---|
| JP | 2011-98729 A | 5/2011 |
| JP | 2015-30293 A | 2/2015 |

* cited by examiner

*Primary Examiner* — Edwin A Young
(74) *Attorney, Agent, or Firm* — Sughrue Mion, PLLC

(57) ABSTRACT

A stopping control apparatus for a vehicle includes: a braking apparatus; a gear-type automatic transmission installed in a powertrain; and a control device configured to control the braking apparatus and the automatic transmission. The control device is configured to shift, after a vehicle transitions from a travel state to a stop state, a range of the automatic transmission to a P range under a state where the braking force applied to wheels is a braking force for maintaining the vehicle in the stop state, and then reduce the braking force applied to the wheels. The control device is configured to change a decrease rate of the braking force such that the decrease rate after a time point at which a predetermined period has elapsed from a start of a decrease in the braking force is less than the decrease rate before the time point.

2 Claims, 6 Drawing Sheets

STOPPING CONTROL APPARATUS FOR VEHICLE

CROSS-REFERENCE TO RELATED APPLICATIONS

The disclosure of Japanese Patent Application No. JP 2015-194267 filed on Sep. 30, 2015 is incorporated herein by reference in its entirety.

BACKGROUND

1. Technical Field

The present disclosure relates to a stopping control apparatus for a vehicle, e.g., a motor vehicle.

2. Description of the Related Art

When a vehicle, e.g., a motor vehicle, stops on a slope, the stop state of the vehicle needs to be maintained even after the stop of the vehicle. For example, in Japanese Patent Application Laid-open No. 2015-30293, there is disclosed a stopping control apparatus configured to carry out hill hold control of applying braking forces to wheels when a hill hold condition is satisfied, and to, when the hill hold control is released, switch a gear-type transmission to a parking lock state before the release. With the stopping control apparatus of this type, compared to a case where the transmission is not switched to the parking lock state before the hill hold control is released, a fear for a movement of the vehicle after the stop on the slope can be reduced.

In general, the switching of the transmission to the parking lock state is achieved by engaging a lock pawl to a gear for locking in the transmission, thereby blocking a rotation of the gear. Backlashes are provided in meshing portions of a plurality of gears in the transmission. Thus, even when the transmission is switched to the parking lock state, the gears meshing with each other on a wheel side with respect to the gear for locking can thus relatively rotate by a gap amount of the backlash.

Therefore, in the stopping control apparatus disclosed in Japanese Patent Application Laid-open No. 2015-30293, when the transmission is switched into the parking lock state, the hill hold control is released, and the braking forces are thus not applied to the wheels, resulting in a state where the retention of the rotation of the wheels by the braking forces is released. A force in a slope descending direction caused by the gravity acts on a vehicle body of the vehicle. Thus, an output shaft of the transmission slightly rotates as a result of the relative rotations of the plurality of gears in the transmission. As a result, the rotations of the wheels may cause the vehicle to slightly move towards the slop descending direction.

Speeds of the fast relative rotations of the plurality of gears increase as an inclination angle of the slope increases. Thus, when the inclination angle of the slope is large, the plurality of gears relatively rotate fast, and a so-called gear rattle and a shock may thus be generated by hard collisions between teeth of the gears meshing with each other.

When the braking forces applied to the wheels are decreased at a low rate at the time of hill hold control release in order to prevent generation of the gear rattle and the shock, a period until the hill hold control release is completed becomes excessively long.

SUMMARY

It is a primary object of exemplary aspects of the present disclosure to reduce a fear for generation of a gear rattle and a shock caused by relative rotations of a plurality of gears in a gear-type transmission when the transmission is switched to a parking lock state by a stopping control apparatus.

According to one embodiment of the present disclosure, there is provided a stopping control apparatus for a vehicle, including: a braking apparatus configured to apply a braking force to wheels; a gear-type automatic transmission installed in a powertrain; and a control device configured to control the braking apparatus and the gear-type automatic transmission, the control device being configured to shift, after the vehicle transitions from a travel state to a stop state, a range of the gear-type automatic transmission to a P range under a state where the braking force applied to the wheels is a braking force for maintaining the vehicle in the stop state, and then reduce the braking force applied to the wheels.

The control device is configured to change a decrease rate of the braking force applied to the wheels such that the decrease rate of the braking force applied to the wheels after a time point at which a predetermined period has elapsed from a start of a decrease in the braking force applied to the wheels is less than the decrease rate of the braking force applied to the wheels before the time point.

With the above-mentioned configuration, the decrease rate of the braking force applied to the wheels after the time point at which the predetermined period has elapsed from the start of the decrease in the braking force applied to the wheels is less than the decrease rate of the braking force applied to the wheels before the time point. Thus, before the time point at which the predetermined period has elapsed from the start of the decrease in the braking force applied to the wheels, the gears can be rotated relatively so as to take up a gap of a backlash between teeth of gears meshing with each other as early as possible in the automatic transmission through the fast decrease in the braking force applied to the wheels. Moreover, after the time point at which the predetermined period has elapsed from the start of the decrease in the braking force applied to the wheels, the decrease rate of the braking force applied to the wheels is decreased. Thus, compared to the case where the decrease rate of the braking force applied to the wheels is not decreased, an acceleration of the relative rotation between the gears meshing with each other can be decreased when the teeth of the gears collide with each other. Thus, it is possible to reduce the fear for the generation of the gear rattle and the shock caused by the hard collision between the teeth of the plurality of gears in the transmission when the gears relatively rotate.

According to one embodiment of the present disclosure, the control device is configured to temporarily stop the decrease in the braking force applied to the wheels when the control device determines that any wheel rotates during the decrease in the braking force applied to the wheels.

According to the above-mentioned embodiment, when any wheel is determined to rotate under the state where the braking force applied to the wheels is decreasing, the decrease in the braking force applied to the wheels is temporarily stopped. Thus, the increase in the acceleration of the relative rotation between the gears meshing with each other can be temporarily prevented. Thus, compared to a case where the decrease in the braking force applied to the wheels is not temporarily stopped, even when the vehicle is stopped on a slope large in the inclination angle, the fear for the generation of the gear rattle and the shock can effectively be decreased.

DETAILED DESCRIPTION

Now, an embodiment of the present disclosure is described in detail with reference to the accompanying drawings.

Embodiment

Figure 1:
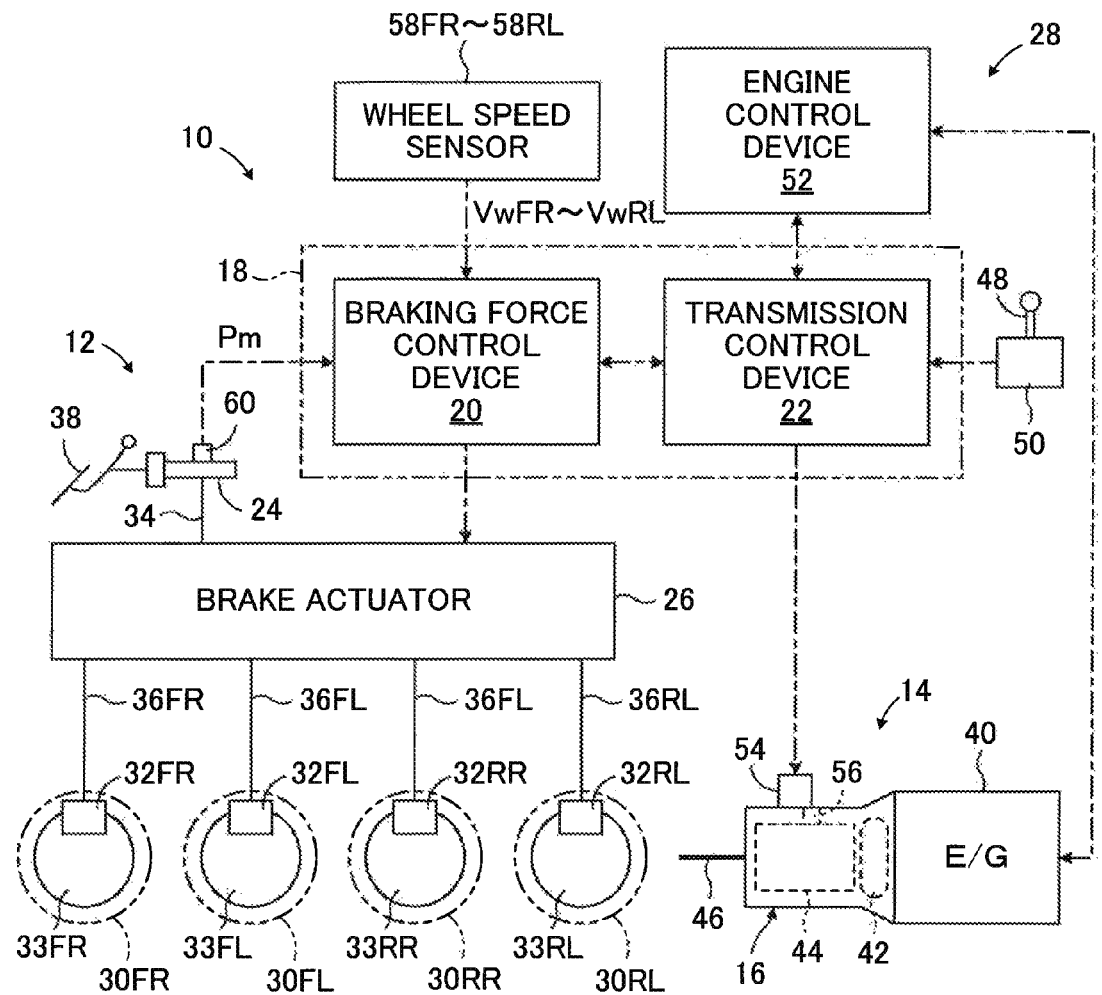
FIG. 1 is a schematic configuration diagram for illustrating a stopping control apparatus for a vehicle according to an embodiment of the present disclosure applied to a vehicle including a hydraulic braking apparatus.

FIG. 1 is a schematic configuration diagram for illustrating a stopping control apparatus 10 for a vehicle according to an embodiment of the present disclosure. The stopping control apparatus 10 includes a braking apparatus 12, a gear-type automatic transmission 16 installed in a powertrain 14, and a control device 18 configured to control the braking apparatus 12 and the automatic transmission 16. The control device 18 includes a braking force control device 20 configured to control the braking apparatus 12, and a transmission control device 22 configured to control the automatic transmission 16.

The braking apparatus 12 is a hydraulic braking apparatus, and includes a master cylinder 24, a brake actuator 26, and wheel cylinders 32FL to 32RR provided respectively on front left and right wheels 30FL and 30FR and rear left and right wheels 30 RL and 30RR of a vehicle 28. The brake actuator 26 is connected to the master cylinder 24 via a brake pipe 34, and is connected to the wheel cylinders 32FL to 32RR respectively via brake pipes 36FL to 36RR. The brake actuator 26 includes a reservoir, an oil pump, and various valve devices, which are not shown in FIG. 1.

The braking apparatus 12 is configured to control a braking pressure of the wheel cylinders 32FL to 32RR, thereby applying braking forces to the wheels 30FL to 30RR. As widely known, the braking force is generated by each of the wheel cylinders 32FL to 32RR pressing each of friction members, e.g., brake pads, to each of rotational bodies 33FL to 33RR, e.g., brake rotors, which is not detailed in FIG. 1.

Pressures Pb within the respective wheel cylinders 32FL to 32RR are usually controlled based on a pressure within the master cylinder 24 (hereinafter referred to as "master cylinder pressure"), which is driven in response to depression of a brake pedal 38 by the driver. Further, irrespective of the depression amount of the brake pedal 38 by the driver, the pressures Pb within the respective wheel cylinders are controlled by the oil pump and the various valve devices within the brake actuator 26 being controlled by the braking force control device 20 as necessary.

The vehicle 28 according to the embodiment is a front-wheel drive vehicle, and driving forces are applied to the front wheels 30FL and 30FR by the powertrain 14. The powertrain 14 includes the automatic transmission 16 and an engine 40. The automatic transmission 16 includes a torque converter 42 and a transmission gear mechanism 44, and is configured to transmit power of the engine 40 to an output shaft 46 connected to the front wheels 30FL and 30FR while a speed is changed. The vehicle may be a rear-wheel drive vehicle or a four-wheel drive vehicle.

A shift lever 48 to be operated by the driver for shifting is provided on the vehicle 28, and a shift position of the shift lever 48 is detected by a position sensor 50. A signal indicating the detected shift position is input from the position sensor 50 to the transmission control device 22. A shift position sensor configured to detect a shift position of the transmission gear mechanism 44 is installed in the automatic transmission 16, which is not shown in FIG. 1, and a signal indicating the shift position of the transmission gear mechanism 44 is also input to the transmission control device 22.

The shift position of the transmission gear mechanism 44 is controlled by the transmission control device 22 by controlling an actuator 54 based on the shift position of the shift lever 48 and a request from an engine control device 52 configured to control the engine 40. Moreover, as described later, the shift position of the transmission gear mechanism 44 is controlled by the transmission control device 22 based on a request from the braking force control device 20. The transmission control device 22 is configured to control the shift position of the transmission gear mechanism 44 in a manner of the shift by wire.

Shift ranges of the transmission gear mechanism 44 include a D range for a normal travel and a P range for parking and stopping. The transmission control device 22 is configured to activate, in the P range, a parking lock device 56 via the actuator 54 to engage a lock pawl to a gear for locking of the transmission gear mechanism 44, thereby blocking the rotation of this gear. In other words, in the P range, the parking lock state is achieved by locking the one gear.

As described later, when the vehicle 28 stops, and a predetermined condition is satisfied, a command signal of instructing a shift of the shift position of the transmission gear mechanism 44 to the P range is output from the braking force control device 20 to the transmission control device 22. The transmission control device 22 is configured to control, upon the reception of this command signal, the shift position of the transmission gear mechanism 44 to shift to the P range independently of the shift position of the shift lever 48.

Although not detailed in FIG. 1, the braking force control device 20, the transmission control device 22, and the engine control device 52 each include a microcomputer and a drive circuit, and are configured to transmit or receive necessary information to/from one another. Each microcomputer generally includes a CPU, a ROM, a RAM, and an input and output port device, those components being connected to one another via a bilateral common bus.

As illustrated in FIG. 1, signals indicating wheel speeds Vwi (i=fl, fr, rl, and rr) of the corresponding wheels are input from wheel speed sensors 58FL to 58RR installed for the wheels 30FL to 30RR to the braking force control device 20. Each of the wheel speed sensors 58FL to 58RR is configured to output a pulse wave after the corresponding wheel rotates by each predetermined rotational angle. In the master cylinder 24, a pressure sensor 60 is installed to detect an internal pressure of the master cylinder 24. A signal indicating the pressure (master cylinder pressure Pm) detected by the pressure sensor 60 is also input to the braking force control device 20. The braking force control device 20 is configured to control the braking forces applied to the wheels 30FL to 30RR based on the master cylinder pressure Pm in a normal state, and to cooperate with the transmission control device 22 to carry out stopping control in accordance with a flowchart illustrated in FIG. 2 when the vehicle 28 is stopped.

<Routine for Stopping Control>

Figure 2:
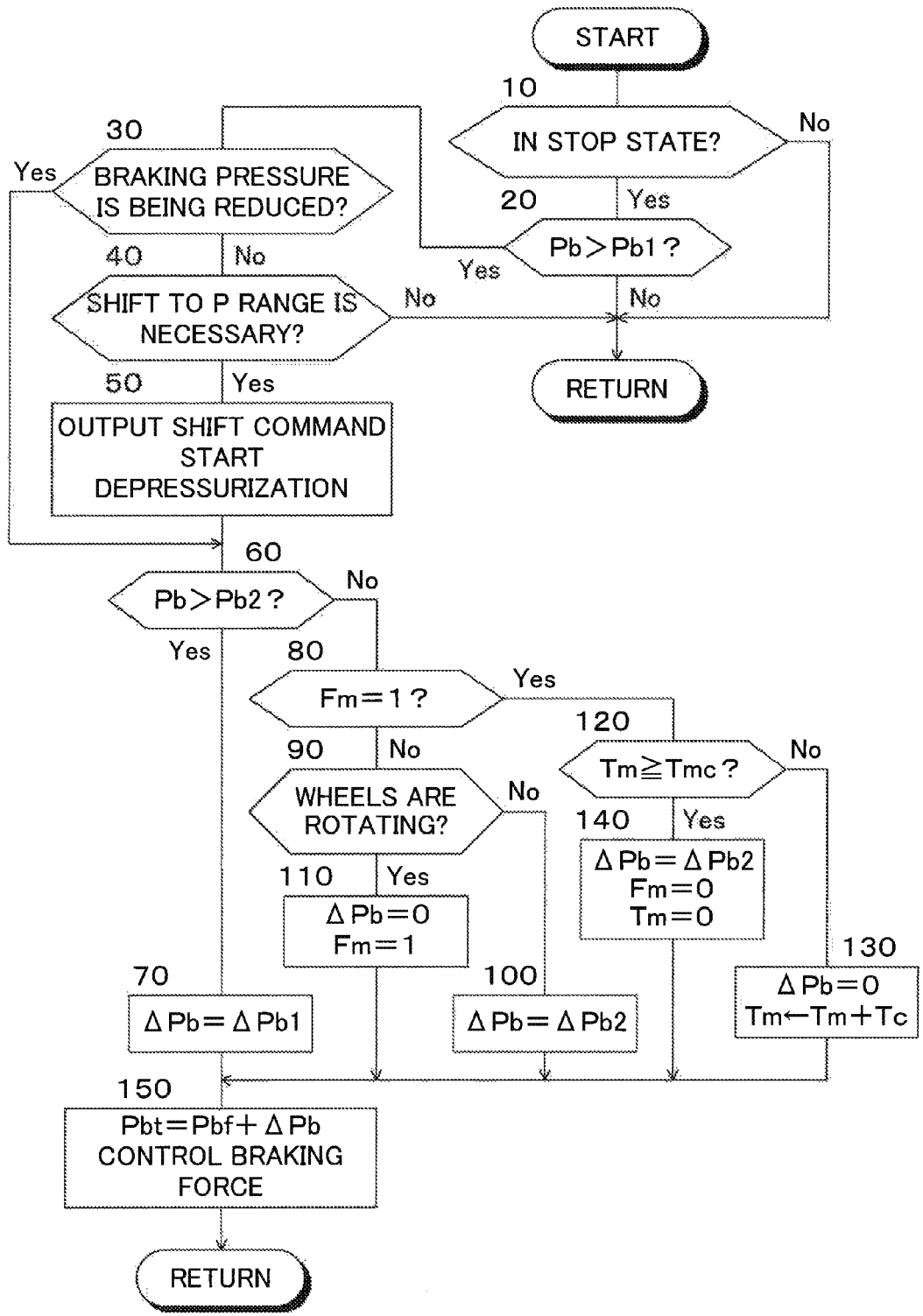
FIG. 2 is a flowchart for illustrating a routine for stopping control according to the embodiment.

Next, a description is given of a routine for stopping control in the embodiment with reference to the flowchart illustrated in FIG. 2. Control in accordance with the flowchart illustrated in FIG. 2 is repeatedly executed at predetermined time periods when an ignition switch (not shown) is on. In the following description, stopping control in accordance with the flowchart illustrated in FIG. 2 is simply referred to as "control".

First, in Step 10, whether or not the vehicle 28 is stopped is determined, for example, based on whether or not the wheel speeds Vwi of all the wheels are 0. When a negative determination is made, the control is once finished, and when an affirmative determination is made, the control proceeds to Step 20. When the control starts, before Step 10, a flag Fm and a count Tm of a timer described later are respectively reset to 0.

In Step 20, a braking pressure Pb for the wheels is estimated based on the master cylinder pressure Pm. It is determined whether or not the braking pressure Pb is more than a reference value Pb1 (positive constant), and whether or not shift control and control for the braking pressure for stopping control are thus carried out. When a negative determination is made, the control is once finished, and when an affirmative determination is made, the control proceeds to Step 30. The reference value Pb1 is equal to or more than a value required to maintain the vehicle 28 in a stop state.

In Step 30, it is determined whether or not the backup braking pressure Pb for maintaining the stop state of the vehicle 28 through the braking forces applied to the wheels is being reduced. When an affirmative determination is made, the control proceeds to Step 60, and when a negative determination is made, the control proceeds to Step 40.

In Step 40, for example, a determination on whether or not the driver has released the seat belt, or has opened a door is used to determine whether or not the driver is preparing to get off the vehicle 28, and the shift control of shifting to the P range for the stopping control is thus necessary. When a negative determination is made, the control is once finished, and when an affirmative determination is made, the control proceeds to Step 50.

In Step 50, a command signal of instructing the shift of the shift position of the transmission gear mechanism 44 to the P range is output to the transmission control device 22. Moreover, the reduction in the braking pressure Pb of the wheel cylinders 32FL to 32RR is started.

In Step 60, it is determined whether or not the braking pressure Pb is more than a reference value Pb2 (positive constant less than Pb1). When a negative determination is made, the control proceeds to Step 80, and when an affirmative determination is made, the control proceeds to Step 70.

In Step 70, a target reduction amount ΔPb of the braking pressure Pb per Tc, which is a cycle time (positive constant) of the flowchart illustrated in FIG. 2, is set to ΔPb1 (negative constant), and then the control proceeds to Step 150.

In Step 80, it is determined whether or not the flag Fm is 1, that is, whether or not the reduction of the braking pressure Pb is being stopped. When an affirmative determination is made, the control proceeds to Step 120, and when a negative determination is made, that is, when the reduction of the braking pressure Pb is continuing, the control proceeds to Step 90.

In Step 90, based on the wheel speeds Vwi detected by the wheel speed sensors 58FL and 58RR, it is determined whether or not the wheels 30FL to 30RR have rotated. When an affirmative determination is made, the control proceeds to Step 110, and when a negative determination is made, the control proceeds to Step 100. Even when the wheels do not actually rotate, the pulse waves may be output from one or two of the wheel speed sensors 58FL to 58RR as a result of a movement of a person in a vehicle cabin. Thus, for example, when the pulse waves are output from three or more of the wheel speed sensors 58FL to 58RR, the wheels may be determined to have rotated.

In Step 100, the target reduction amount ΔPb of the braking pressure Pb is set to ΔPb2 (negative constant smaller in the absolute value than ΔPb1). In Step 110, the target reduction amount ΔPb of the braking pressure Pb is set to 0, and the flag Fm is set to 1. When Step 100 or Step 110 is completed, the control proceeds to Step 150.

In Step 120, it is determined whether or not the count Tm of the timer is equal to or more than a reference value Tmc (positive constant). When an affirmative determination is made, the control proceeds to Step 140, and when a negative determination is made, the control proceeds to Step 130.

In Step 130, the target reduction amount ΔPb of the braking pressure Pb is set to 0, and the count Tm of the timer is incremented by Tc. In Step 140, the target reduction amount ΔPb of the braking pressure Pb is set to ΔPb2, and the flag Fm and the count Tm of the timer are reset to 0. When Step 130 or Step 140 is completed, the control proceeds to Step 150.

In Step 150, a target braking pressure Pbt for the wheels is set to a sum Pbf+ΔPb of a previous value Pbf of the braking pressure Pb and the target reduction amount ΔPb, and the braking pressure Pb for the wheels is controlled by the brake actuator 26 so as to reach the target braking pressure Pbt.

<Operation of Stopping Control Apparatus 10>

Figure 3:
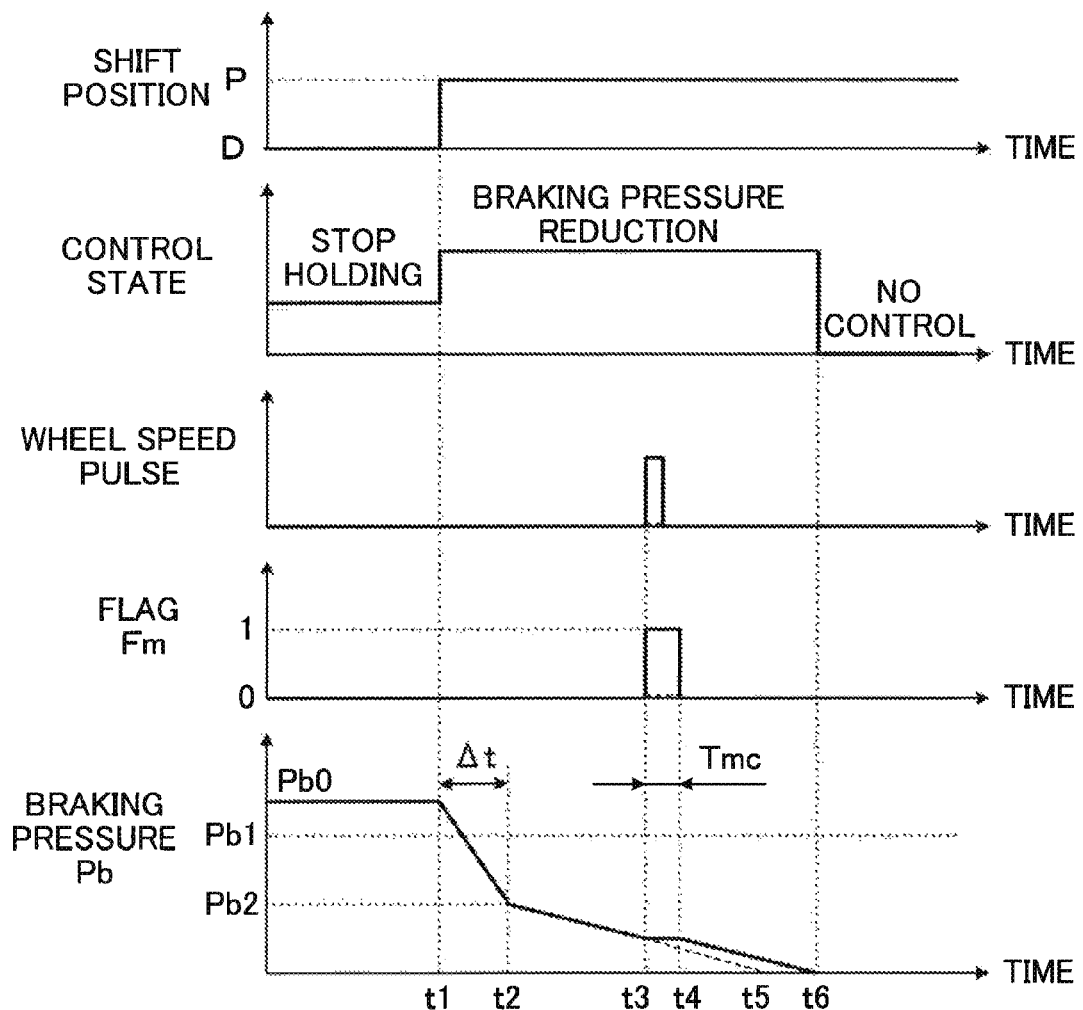
FIG. 3 is a time chart for illustrating an operation of the stopping control apparatus according to the embodiment.

Referring to a time chart illustrated in FIG. 3, a description is now given of an operation of the stopping control apparatus 10 according to the embodiment.

As illustrated in FIG. 3, it is assumed that the shift position of the transmission gear mechanism 44 is the D range, the braking pressure Pb for the wheels is Pb0 more than the reference value Pb1, and the vehicle 28 maintains the stop state until a time point immediately before a time point t1. The affirmative determinations are made in Steps 10 and 20, but the negative determinations are made in Steps 30 and 40. Thus, the processing starting from Step 50 is not carried out, and the shift control of shifting to the P range and the reduction of the braking pressure Pb are not carried out.

At the time point t1, when the shift control of shifting to the P range becomes necessary for the stopping control, the affirmative determination is made in Step 40, and the processing in Step 50 is carried out. Thus, the command signal of instructing the shift of the shift position of the transmission gear mechanism 44 to the P range is output to the transmission control device 22, and the shift position of the transmission gear mechanism 44 is shifted to the P range by the transmission control device 22. Moreover, the reduction of the braking pressure Pb is started, and the target reduction amount ΔPb per cycle time Tc is set to ΔPb1, resulting in a relatively fast reduction of the braking pressure Pb.

When the braking pressure Pb becomes equal to or less than the reference value Pb2 at a time point t2, the negative determinations are made in Steps 60, 80, and 90, and Step 100 is carried out. Thus, the target reduction amount ΔPb of the braking pressure Pb is set to ΔPb2, and a reduction gradient of the braking pressure Pb is decreased.

A predetermined period Δt from the time point t1 at which the reduction of the braking pressure Pb is started to the time point t2 at which the target reduction amount ΔPb is changed to ΔPb2 is determined based on the braking pressure Pb0 at the start of the depressurization, the reference value Pb2, and the reduction amount ΔPb1. In other words, Δt is represented as Expression (1).

$$\Delta t = (Pb2 - Pb0)/\Delta Pb1 \quad (1)$$

It is assumed that while the braking pressure Pb is being reduced after the target reduction amount ΔPb is set to ΔPb2, pulse waves are output from three or more of the wheel speed sensors 58FL to 58RR at a time point t3. In Step 90, the affirmative determination is made. In Step 110, the target reduction amount ΔPb of the braking pressure Pb is set to 0, and the flag Fm is set to 1. Thus, in Step 80, the affirmative determination is made. In Steps 120 to 140, during a period from the time point t3 to a time point t4 corresponding to an elapse of time of the reference value Tmc, the reduction of the braking pressure Pb is stopped, and the braking pressure Pb is thus maintained to the braking pressure at the time point t3.

At the time point t4, in Step 120, the affirmative determination is made, and, in Step 140, the flag Fm is reset to 0. Thus, the negative determinations are made in Steps 80 and 90. Therefore, after the time point t4, the braking pressure Pb is reduced while the target reduction amount ΔPb is set to ΔPb2, and, for example, at a time point t6, the braking pressure Pb becomes 0, and the reduction of the braking pressure Pb is thus completed.

As indicated by the broken line of FIG. 3, when the output of the pulse waves from three or more of the wheel speed sensors 58FL to 58RR are not detected after the time point t2, the affirmative determination is not made in Step 90. Thus, the reduction of the braking pressure Pb is not stopped in Steps 120 to 140, and the state where the braking pressure Pb is reduced while the target reduction amount ΔPb is set to ΔPb2 thus continues. The braking pressure Pb becomes 0 at a time point t5 earlier than the time point t6, and the reduction of the braking pressure Pb is thus completed.

Moreover, although not shown in FIG. 2 or FIG. 3, even when, in Step 10, the vehicle 28 is determined to be stopped, but, in Step 20, the braking pressure Pb is determined to be less than the reference value Pb1, it is considered that a fear for the movement of the vehicle is low even when the braking forces applied to the wheels are released. Thus, the braking pressure Pb may be decreased relatively fast.

As appreciated from the description given above, according to this embodiment, the decrease rate of the braking pressure Pb after the time point t2 when the predetermined period Δt has elapsed after the start of the reduction of the braking pressure Pb is less than the decrease rate of the braking pressure Pb before the time point t2. Thus, before the time point t2 at which the predetermined period has elapsed from the start of the reduction of the braking pressure Pb, the gears can be rotated relatively so as to take up a gap of a backlash between teeth of the gears meshing with each other as early as possible in the automatic transmission 16 through the fast decrease in the braking forces applied to the wheels.

Moreover, after the time point t2 at which the predetermined period has elapsed from the start of the reduction of the braking pressure Pb, the decrease rate of the braking pressure Pb is decreased. Thus, compared to the case where the decrease rate of the braking pressure Pb is not decreased, an acceleration of the relative rotation between the gears meshing with each other can be reduced when teeth of the gears collide with each other. Thus, a fear for generation of a gear rattle and a shock caused by the hard collision between the teeth of the plurality of gears can be decreased in the transmission 16 when the gears relatively rotate.

According to the embodiment, when the rotations of at least three wheels are detected under the state where the braking pressure Pb is being reduced, the reduction of the braking pressure Pb is temporarily stopped. Thus, the acceleration of the relative rotation between the gears meshing with each other can be temporarily prevented from increasing in the transmission 16. Thus, compared to a case where the reduction of the braking pressure Pb is not temporarily stopped, even when the vehicle 28 is stopped on a slope large in the inclination angle, the fear for the generation of the gear rattle and the shock can effectively be decreased.

Modified Example

The above-mentioned embodiment is applied to the vehicle 28 in which the braking apparatus 12 is the hydraulic braking apparatus, but the stopping control apparatus 10 according to the present disclosure may be applied to the vehicle 28 in which the braking apparatus 12 is an electromagnetic braking apparatus.

Figure 4:
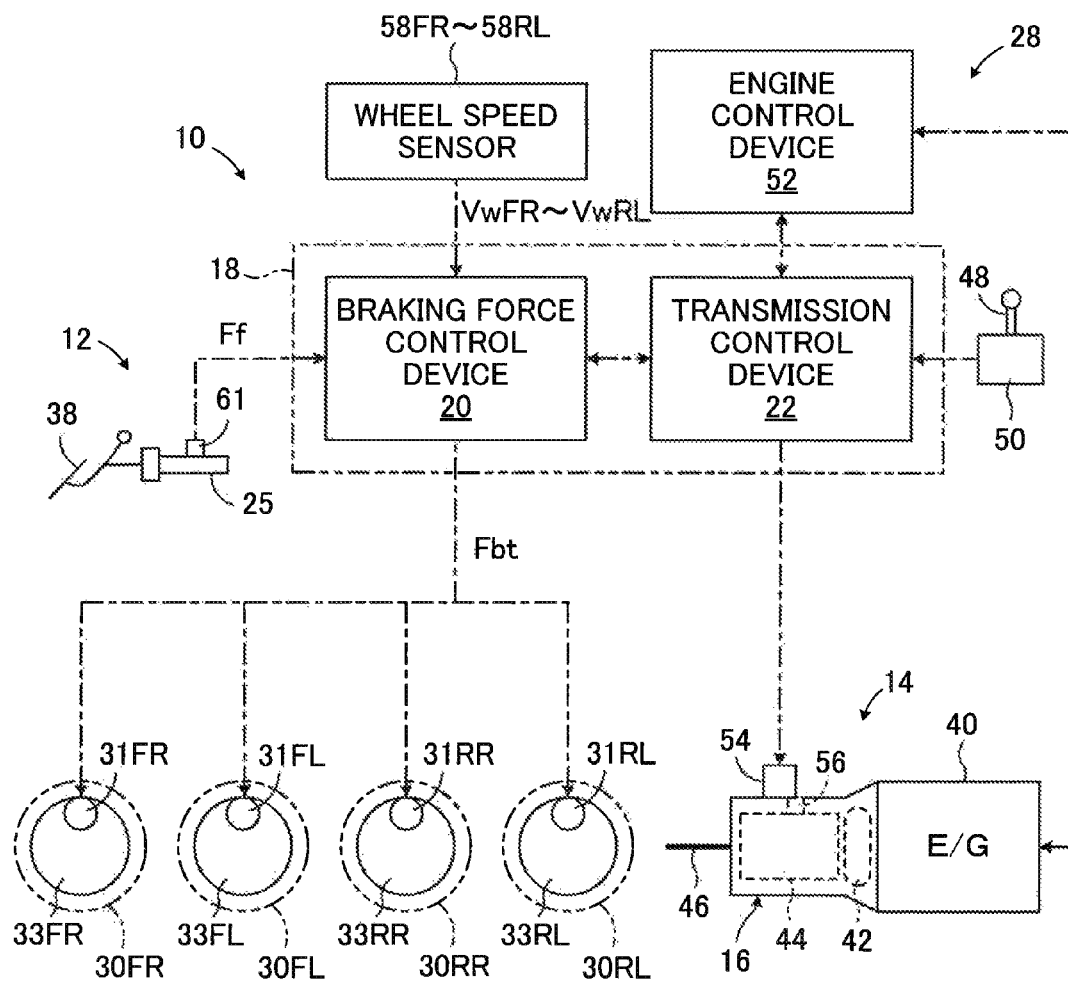
FIG. 4 is a schematic configuration diagram for illustrating a stopping control apparatus for a vehicle according to a modified example of the present disclosure applied to a vehicle including an electromagnetic braking apparatus.

FIG. 4 is a schematic configuration diagram for illustrating the stopping control apparatus 10 for a vehicle according to a modified example applied to the vehicle including the electromagnetic braking apparatus. In FIG. 4, like members as those illustrated in FIG. 1 are denoted by like reference symbols as those of FIG. 1.

In the modified example, the brake actuator 26 according to the embodiment is not provided, and the master cylinder 24 is replaced by a stroke simulator 25. Moreover, the wheel cylinders 32FL to 32RR are replaced by electromagnetic actuators 31FL to 31RR. The electromagnetic actuators 31FL to 31RR are configured to be electrically energized by control currents supplied from the braking force control device 20, and to generate braking forces Fb by pressing friction members, e.g., brake pads, to the rotational bodies 33FL to 33RR, e.g., brake rotors, which is not shown in FIG. 4.

A depression force sensor 61 configured to detect a depression force Ff applied by the driver to the brake pedal 38 is provided in the stroke simulator 25, and a signal indicating the depression force Ff is input to the braking force control device 20. The braking force control device 20 is configured to calculate a target braking force Fbt for the wheels 30FL to 30RR based on the depression force Ff, and to control the control currents to the electromagnetic actuators 31FL to 31RR based on the target braking force Fbt so that the braking forces Fb applied to the wheels reach the target braking force Fbt.

Figure 5:
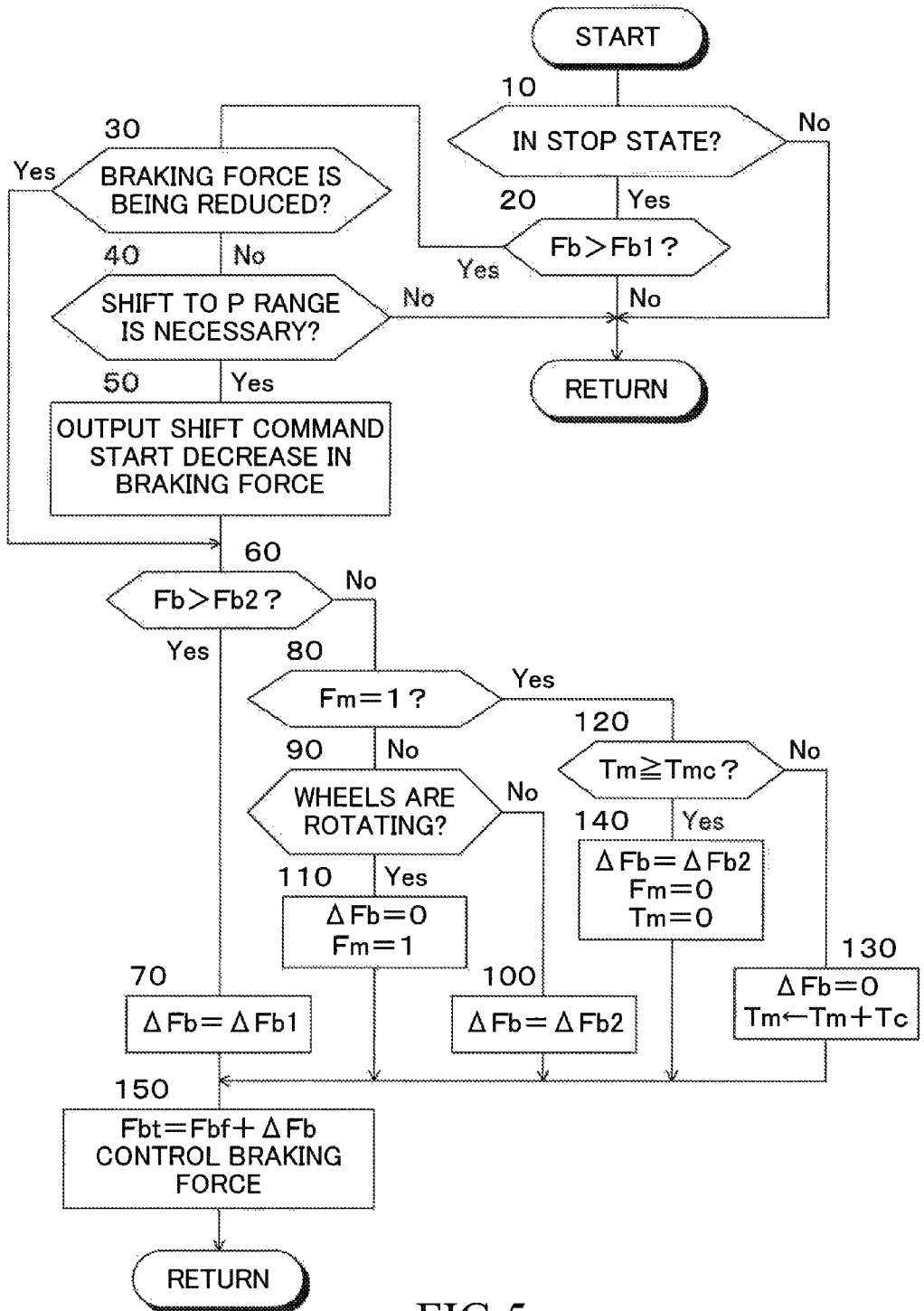
FIG. 5 is a flowchart for illustrating a routine for stopping control according to the modified example.

FIG. 5 is a flowchart for illustrating a routine for stopping control according to the modified example. In FIG. 5, like steps as those illustrated in FIG. 2 are denoted by like step numbers as those of FIG. 2.

As appreciated from a comparison between FIG. 5 and FIG. 2, the braking pressure Pb and the reference values Pb1 and Pb2 in Steps 20 and 60 are respectively replaced by the braking force Fb and reference values Fb1 and Fb2. The target reduction amounts ΔPb, ΔPb1, and ΔPb2 of the braking pressure Pb in Steps 70, 100, 110, and 130 to 150 are respectively replaced by target decrease amounts ΔFb, ΔFb1, and ΔFb2 of the braking force Fb. Further, the target braking pressure Pbt of the braking pressure Pb and the previous value Pbf of the braking pressure Pb in Step 150 are respectively replaced by a target braking force Fbt and a previous value Fbf of the braking force Fb.

Figure 6:
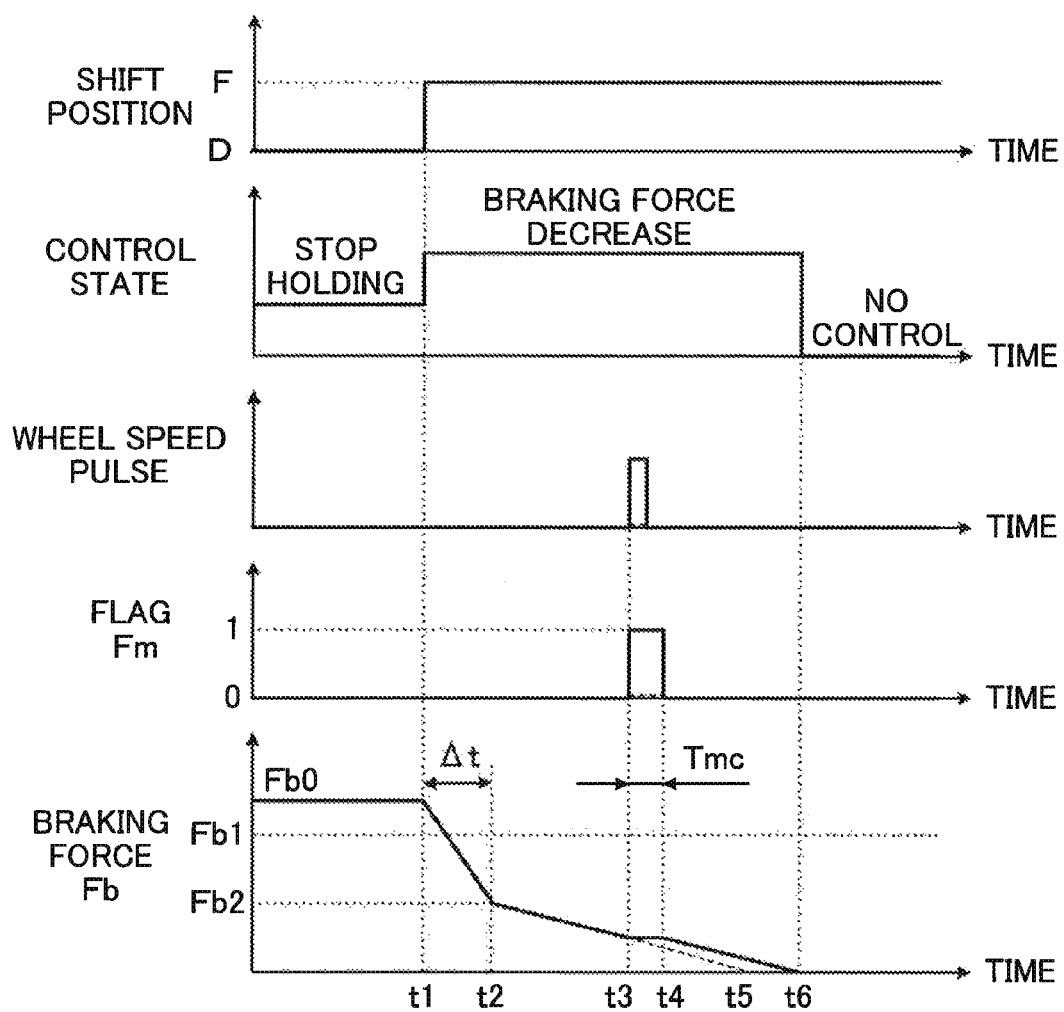
FIG. 6 is a time chart for illustrating an operation of the stopping control apparatus according to the modified example.

FIG. 6 is a time chart for illustrating an operation of the stopping control apparatus 10 according to the modified example. As appreciated from a comparison between FIG. 6 and FIG. 3, a control state from the time point t1 to the time point t6 is a state where the braking force Fb is decreased. Moreover, a bottom row of FIG. 6 indicates a change in the braking force Fb. A braking force before the start of the decrease in the braking force Fb is Fb0. The reference values corresponding to the reference values Pb1 and Pb2 according to the embodiment are respectively Fb1 and Fb2. Similar to the reference values Pb1 and Pb2, the reference values Fb1 and Fb2 are positive constants. Similar to the target reduction amounts ΔPb1 and ΔPb2, the target decrease amounts ΔFb1 and ΔFb2 of the braking force Fb are negative constants.

A predetermined period Δt from the time point t1 at which the decrease of the braking force Fb is started to the time point t2 at which the target decrease amount ΔFb is changed to ΔFb2 is determined based on the braking force Fb0 at the start of the decrease of the braking force Fb, the reference value Fb2, and the target decrease amount ΔFb1. In other words, Δt is represented as Expression (2).

$$\Delta t = (Fb2 - Fb0)/\Delta Fb1 \qquad (2)$$

According to the modified example, the braking force Fb is controlled as the braking pressure Pb according to the embodiment. Thus, in the vehicle in which the braking apparatus is the electromagnetic braking apparatus, the fear for the generation of the gear rattle and the shock caused by the hard collision between the teeth of the plurality of gears can be decreased in the transmission when the gears relatively rotate after the shift position of the automatic transmission 16 is shifted to the P range.

The specific embodiment of the present disclosure is described in detail above. However, the present disclosure is not limited to the embodiment and modified example described above. It is apparent to those skilled in the art that various other embodiments may be employed within the scope of the present disclosure.

For example, according to the embodiment, the reference values Pb2 and Tmc are respectively positive constants, but those reference values may be modified so as to be variably set depending on the braking pressure Pb0, for example, so as to increase as the braking pressure Pb0 before the start of the depressurization increases.

Similarly, according to the modified example, the reference values Fb2 and Tmc are respectively positive constants, but those reference values may be modified so as to be variably set depending on the braking force Fb0, for example, so as to increase as the braking force Fb0 before the start of the braking force decrease increases.

Moreover, according to the embodiment, the reduction amounts ΔPb1 and ΔPb2 of the braking pressure Pb are constant values, but at least one of those reduction amounts may be changed as the time elapses, for example, so as to gradually decrease in the magnitude as the time elapses.

Similarly, according to the modified example, the decrease amounts ΔFb1 and ΔFb2 of the braking force Fb are constant values, but at least one of those decrease amounts may be changed as the time elapses, for example, so as to gradually decrease in the magnitude as the time elapses.

Moreover, according to the embodiment, the predetermined period Δt from the time point t1 at which the reduction of the braking pressure Pb is started to the time point t2 at which the reduction amount ΔPb is changed to ΔPb2 is determined based on the braking pressure Pb0 at the start of the depressurization, the reference value Pb2, and the target reduction amount ΔPb1 as represented by Expression (1). However, the predetermined period Δt from the time point t1 at which the reduction of the braking pressure Pb is started to the time point t2 at which the target reduction amount ΔPb is changed to ΔPb2 may be set in advance, and the determination in Step 60 may be replaced by a determination on whether or not the elapsed time from the time point t1 is equal to or more than the predetermined period Δt. In this case, the reference value Pb2 may be calculated in accordance with Expression (3), and may thus be variably set depending on the braking pressure Pb0 when the reduction of the braking pressure Pb is started, and the target reduction amount ΔPb1.

$$Pb2 = Pb0 + \Delta Pb1 * \Delta t \qquad (3)$$

Similarly, according to the modified example, the predetermined period Δt from the time point t1 at which the decrease of the braking force Fb is started to the time point t2 at which the decrease amount ΔFb is changed to ΔFb2 is determined based on the braking force Fb0 at the start of the decrease of the braking force Fb, the reference value Fb2, and the target decrease amount ΔFb1 as represented by Expression (2). However, the predetermined period Δt from the time point t1 at which the decrease of the braking force Fb is started to the time point t2 at which the target decrease amount ΔFb is changed to ΔFb2 may be set in advance, and the determination in Step 60 may be replaced by a determination on whether or not the elapsed time from the time point t1 is equal to or more than the predetermined period Δt. In this case, the reference value Fb2 may be calculated in accordance with Expression (4), and may thus be variably set depending on the braking force Fb0 when the decrease of the braking force Fb is started, and the target decrease amount ΔFb1.

$$Fb2 = Fb0 + \Delta Fb1 * \Delta t \qquad (4)$$

Moreover, according to the embodiment and the modified example, when the wheels are determined to have rotated at the time point t3, the reduction in the braking pressure Pb and the decrease in the braking force Fb are respectively stopped temporarily, thereby maintaining the braking forces applied to the wheels to the braking forces at the time point t3. However, the determination of the rotations of the wheels and the temporary stop of the reduction in the braking pressure Pb or the decrease in the braking force Fb may be omitted. Moreover, when the wheels are determined to have rotated, the braking pressure Pb and the braking force Fb may respectively be modified so as to temporarily increase.

Moreover, according to the embodiment and the modified example, whether or not the wheels have rotated is determined based on whether or not the pulse waves are output by at least three of the wheel speed sensors 58FL and 58RR. However, the determination on whether or not the wheels have rotated may be modified to a determination on whether or not the vehicle has moved based on a signal from, e.g., a longitudinal acceleration sensor, and a CCD camera installed on a vehicle for control of vehicle driving support.

What is claimed is:

1. A stopping control apparatus for a vehicle, comprising:
a braking apparatus configured to apply a braking force to wheels;
a gear-type automatic transmission installed in a powertrain; and
a controller configured to control the braking apparatus and the gear-type automatic transmission,
the controller being configured to shift, after the vehicle transitions from a travel state to a stop state, a range of the gear-type automatic transmission to a P range under a state where the braking force applied to the wheels is a braking force for maintaining the vehicle in the stop state, and then reduce the braking force applied to the wheels, wherein
the controller is configured to change a decrease rate of the braking force applied to the wheels such that the decrease rate of the braking force applied to the wheels after a time point at which a predetermined period has elapsed from a start of a decrease in the braking force applied to the wheels is less than the decrease rate of the braking force applied to the wheels before the time point.

2. The stopping control apparatus for a vehicle according to claim 1, wherein the controller is configured to temporarily stop the decrease in the braking force applied to the wheels when the controller determines that any wheel rotates during the decrease in the braking force applied to the wheels.

* * * * *